United States Patent [19]

Fond

[11] Patent Number: 5,398,596
[45] Date of Patent: * Mar. 21, 1995

[54] EXTRACTION DEVICE FOR PREPARATION OF A BEVERAGE

[75] Inventor: Olivier Fond, Yverdon, Switzerland

[73] Assignee: Nestec S.A., Vevey, Switzerland

[*] Notice: The portion of the term of this patent subsequent to Mar. 30, 2010 has been disclaimed.

[21] Appl. No.: 59,456

[22] Filed: May 5, 1993

Related U.S. Application Data

[63] Continuation of Ser. No. 724,604, Jul. 2, 1991, abandoned.

[30] Foreign Application Priority Data

Jul. 27, 1990 [EP] European Pat. Off. ............ 90114402

[51] Int. Cl.⁶ .............................................. A47J 31/00
[52] U.S. Cl. ........................................ 99/295; 99/300; 99/302 R
[58] Field of Search ............. 99/279, 295, 300, 302 R, 99/306, 307, 316, 317

[56] References Cited

U.S. PATENT DOCUMENTS

| | | | |
|---|---|---|---|
| 2,451,195 | 10/1948 | Brown . | |
| 2,869,451 | 1/1959 | Brandl | 99/302 R |
| 3,007,392 | 11/1961 | Pecoraro | 99/302 R |
| 3,561,349 | 2/1971 | Endo | 99/307 |
| 4,136,202 | 1/1979 | Favre | 99/295 |
| 4,429,623 | 2/1984 | Illy | 99/302 R |
| 4,846,052 | 7/1989 | Favre | 99/295 |
| 5,197,374 | 3/1993 | Fond . | |
| 5,242,702 | 9/1993 | Fond . | |

FOREIGN PATENT DOCUMENTS

| | | | |
|---|---|---|---|
| 1255237 | 1/1961 | France | 99/302 R |
| 2062337 | 6/1971 | France . | |
| 2182167 | 7/1973 | France . | |
| 2556323 | 6/1985 | France . | |
| 7430109 | 3/1976 | Germany . | |
| 314618 | 2/1934 | Italy | 99/302 R |

*Primary Examiner*—David A. Scherbel
*Assistant Examiner*—Randall E. Chin
*Attorney, Agent, or Firm*—Vogt & O'Donnell

[57] ABSTRACT

A device for the extraction of a beverage material contained in a cartridge has a surface member of which at least a portion has a flat surface and a size at least sufficient to overlay and cover at least a peripheral surface of a cartridge, which contains a beverage to be extracted and which is positioned adjacent the member, to effect imperviousness between the flat surface of the surface member and the cartridge during extraction of the beverage material contained in the cartridge. The device also has an injector which extends through the surface member for piercing into the cartridge. The injector extends longitudinally perpendicular to the flat surface of the surface member and has outlets disposed for directing water ejected from the injector for extraction of the beverage material at an angle of from 90° to 65° with reference to a longitudinally extending portion of the injector at the outlets.

14 Claims, 2 Drawing Sheets

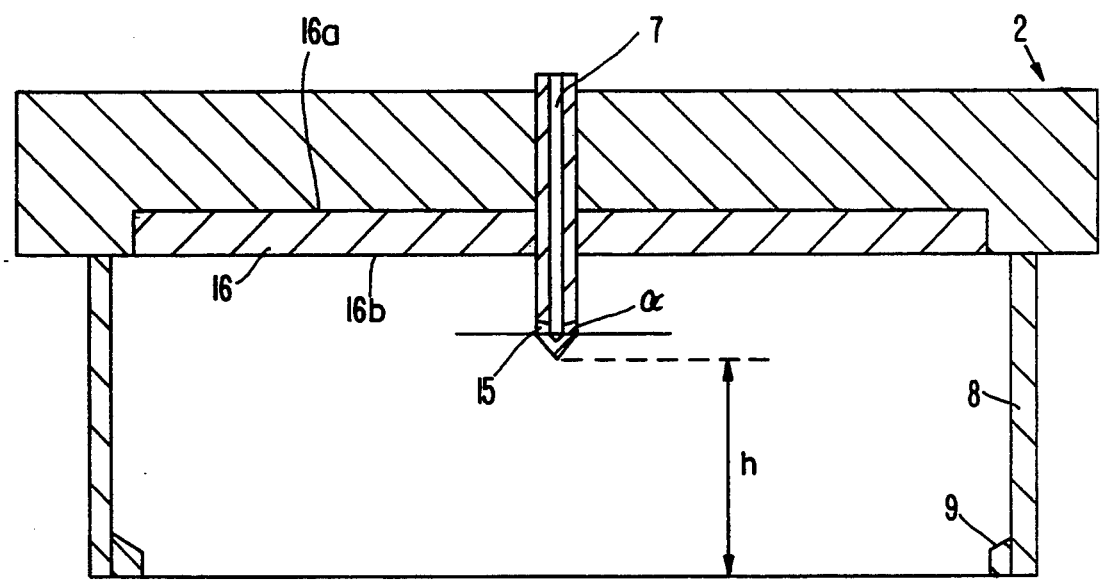
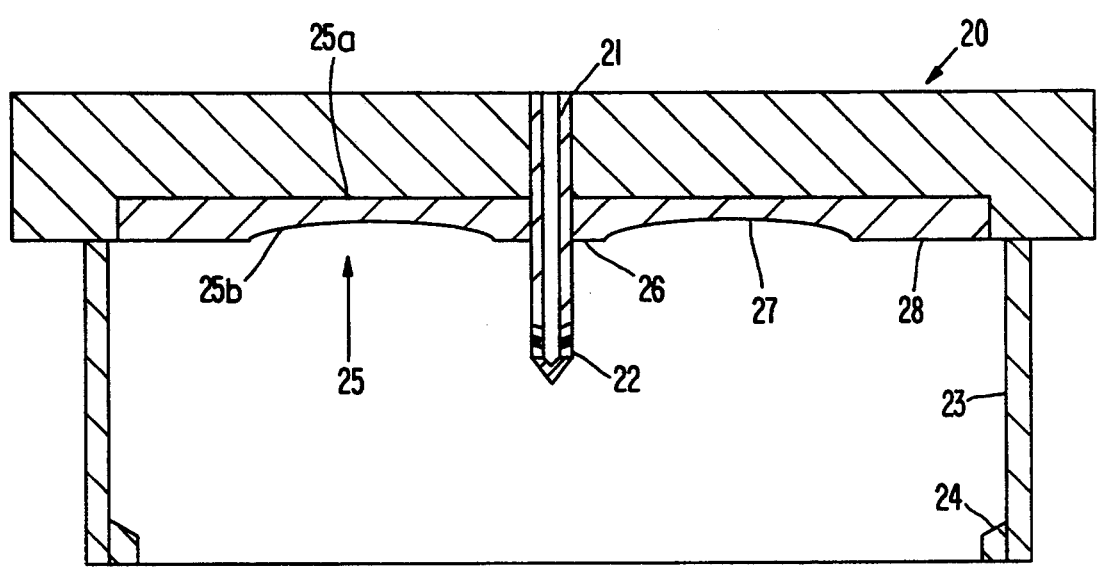

EXTRACTION DEVICE FOR PREPARATION OF A BEVERAGE

This application is a continuation of application Ser. No. 07/724,604, filed on Jul. 2, 1991, now abandoned.

BACKGROUND OF THE INVENTION

This invention relates to a device for the extraction of a material contained in cartridges designed for the preparation of a beverage in a cartridge holder for coffee machines.

European Patent Application Publication No. 242 556 relates to a device for the extraction of a material contained in cartridges comprising a hollow cylindrical body with an inner shape substantially corresponding to the outer shape of the cartridge to be extracted, the body comprising an injector at its upper end following the axis of the cylinder and, on its outer part, a spring holding a ring for the release of the cartridge after extraction. Although a device of this type enables a coffee of good quality to be obtained, it can only be used with one type and one shape of cartridge perfectly adaptable to the inner shape of the hollow cylinder.

The extraction device according to the invention can be used much more universally, i.e., for the extraction of cartridges of different shapes and sizes, is relatively simple in design and enables material contained in cartridges to be dependably extracted with good reproducibility.

SUMMARY OF THE INVENTION

The present invention relates to a device for the extraction of a material contained in cartridges designed for the preparation of a beverage in a cartridge holder for coffee machines, comprising a tightening ring with tightening ramps for the cartridge holder, an injector coaxial with the tightening ring and, around the periphery of the injector, a circular surface perpendicular to the injector and designed to ensure imperviousness on the upper face of said cartridge during its extraction.

The present invention is characterized in particular in that the extraction device has a member of which at least a portion forms a flat, or planar, surface having a size sufficient to overlay and cover at least a peripheral surface of a cartridge, the cartridge containing a beverage material to be extracted and being positioned adjacent the surface member for extraction of the beverage material, to effect imperviousness between the flat surface of the member and the cartridge during extraction of the beverage material in the cartridge, in that an injector extends longitudinally through the surface member perpendicular to the flat surface for piercing into the cartridge, and in that the injector has outlets disposed for directing water ejected from the injector, for extraction of the beverage material, at an angle of from 90° to 65° with reference to a longitudinally extending portion of the injector at the outlets.

DETAILED DESCRIPTION OF THE INVENTION

As embodied and disclosed throughout this disclosure, the flat surface has a circular shape.

The circular surface may be completely flat, above all if the cartridge employed has a flat upper face. It may also have a circular concave part with the injector, particularly in cases where the cartridge employed has a curved upper face. In any event, the surface is always flat in the zone where the imperviousness of the cartridge is established, i.e., in the zone close to the periphery of the cartridges. The imperviousness is totally guaranteed by this circular surface.

The injector consists of an injection needle which performs the dual function of perforating the upper face of the cartridge and injecting water. The injector comprises between one and ten and preferably between four and eight holes uniformly distributed around the periphery of the injector and optionally at two levels. The axis of the holes of the injector forms an angle of 0° to 25° with the horizontal. By horizontal is meant the plane formed by the flat circular surface. Thus, as further disclosed below and in the drawing Figures, the injector has outlets disposed for directing water ejected from the injector at an angle of from 90° to 65° with reference to a longitudinally extending portion of the injector at the outlets.

By angle is meant the angle formed above the plane of the horizontal. By virtue of the geometry of the holes of the needle, the water is thus directed towards the top of the cartridge so that it is uniformly distributed over the entire surface of the cartridge after deflection at the top of the cartridge.

The orientation of the holes of the injection needle is favourable because it permits the use of cartridges having variable sizes and height-to-diameter ratios, more particularly with small values (from 1 to 0.12), and relatively lightly compacted layers of coffee.

This is because, by being directed slightly upwards, the water injected through the few holes of the needle is deflected in the upper zone of the cartridge and is returned towards the layer of coffee in far more dispersed form. Thus, the water comes into contact with the layer of coffee after partial dispersion and no longer in the form of a few localized jets.

This phenomenon is important during the first few seconds of the extraction process when the layer of coffee is not stabilized. In addition, this dispersion is favourable if it is desired to obtain a dispersion and reduction of the kinetic energy of the water injected so that the layer of coffee is not excessively compacted, thus avoiding any risk of the layer of coffee choking under excessive pressure. By being lightly compacted, the layer of coffee moves from its place in the cartridge which is then taken by the water.

During the remainder of the extraction process, the jets of water are then released more or less into this volume of water and, in no case, are the jets directed directly onto the coffee.

The holes of the injector are between 0.2 and 1.5 mm in diameter. They must be long enough to allow the water to arrive under a pressure of as high as 20 bar, but must not be too large in order to avoid any risk of reflux of the coffee grounds on completion of extraction.

To be sure of good penetration of the water into the cartridge during the extraction process, the holes of the injector are situated at a distance of 3 to 8 mm from the circular surface.

The distance between the bottom of the injector and the lower edge of the tightening ramp is at least equal to the thickness of the tightening ramp, for example at least 5 mm and as much as 25 mm, depending on the configurations of the cartridge holders and the cartridges. The object is to ensure both minimal and the cleanest possible tearing of the upper face of the cartridge to avoid soiling of the extraction device with coffee grounds during release of the cartridge after extraction.

The cartridge is held in the extraction device by means of a cartridge holder of which the internal geometry is variable according to the size of the cartridges used. It comprises two diametrically opposite retaining lugs designed to cooperate with the tightening ramps of the tightening ring. The opening of the tightening ramps should be the smallest possible in relation to the width of the retaining lugs of the cartridge holder to promote better centering of the cartridge before it is perforated by the water injector. After the cartridge holder has been secured in the tightening ring, the imperviousness of the extraction device is established by compression of the outer ring of the cartridges against the flat circular surface of the device according to the invention.

The circular surface is made of a material which ensures high impermeability, i.e., either a flexible material, such as natural or synthetic rubber, or a rigid material, such as TEFLON-ized steel and such as INOX coated with PTFE (Teflon) or filled PTFE.

The use of several types or sizes of cartridges from one and the same extraction device is made possible by using cartridge holders of which the inner part is specific to the cartridge while the outer part, common to all types, is compatible with the tightening ring.

In particular, it is possible to use the cartridges according to applicants' European Patent Application filed on the same date as the present application under the title "A sealed cartridge for the preparation of a beverage and a process and device for its production" (EP 90114404.8).

It is also possible to use the extraction device according to applicants' European Patent Application filed on the same date as the present application under the title "A process and a device for the extraction of sealed cartridges" (EP 90114401.4).

It is also possible to employ open cartridges, for example those of the European Patent Application No. 90114405.5.

After extraction, the cartridges are easily released by loosening the cartridge holder and releasing the cartridge simply by inverting the cartridge holder.

The invention is described in more detail in the following with reference to the accompanying drawings.

BRIEF DESCRIPTION OF THE DRAWINGS

FIG. 1 is a section through the device according to the invention.

FIG. 2 is a section through a second embodiment of the device according to the invention.

DETAILED DESCRIPTION OF THE DRAWINGS

Figure 3:
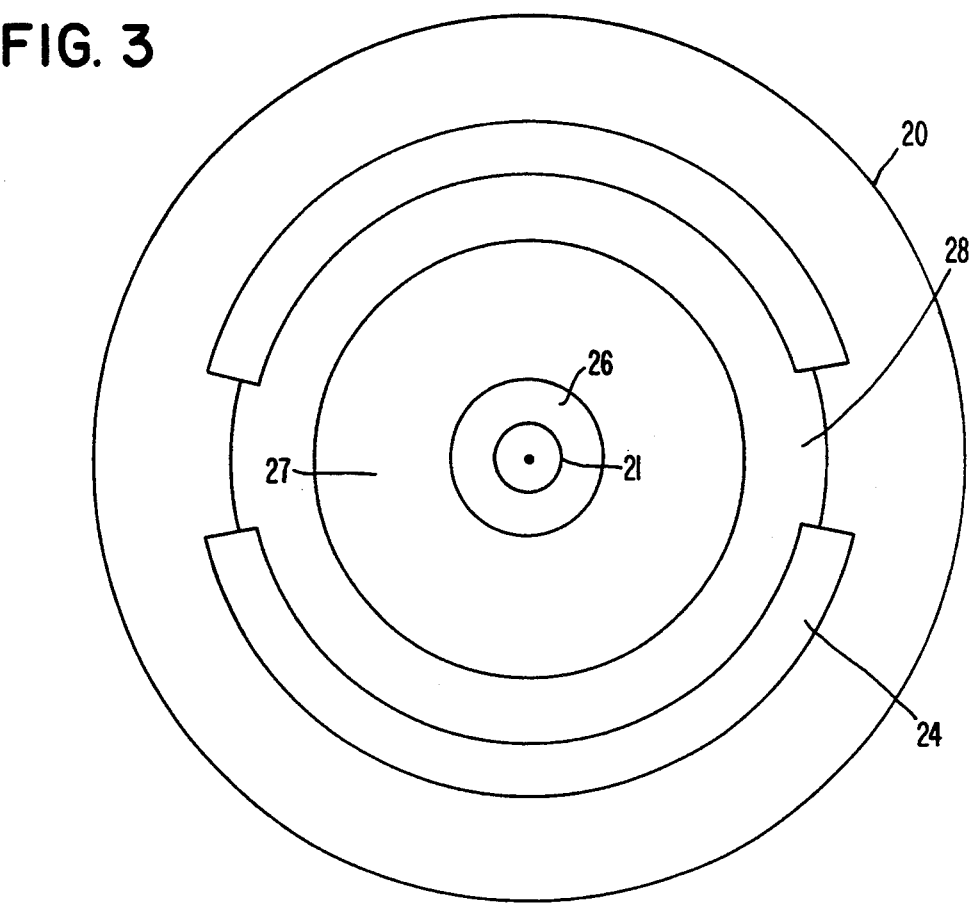
FIG. 3 is a view from beneath of the device shown in FIG. 2.

The extraction device according to the invention comprises a water injector (7) which extends longitudinally from a base of a housing (2) of the device and which has water outlet holes (15) forming an angle α with the horizontal. In FIG. 1, this angle is 20° and as may be appreciated, is 70° with reference to a longitudinally extending portion of the injector at the outlets. The extraction device additionally comprises a tightening ring (8) with tightening ramps (9) and, around the periphery of the injector (7), a flat circular surface (16) of rubber to establish imperviousness during extraction of the material contained in the sealed cartridge. The flat circular surface (16) thus provides a seal member which has a first surface (16a) positioned adjacent the housing base and a second surface (16b) which opposes the first surface (16a) so that the surfaces (16a) and (16b) extend in a direction perpendicular to the longitudinal axis of other injector (7).

FIG. 1 also shows the distance between the bottom of the injector and the lower edge of the tightening ramp of the tightening ring. In the case of this configuration, h=10 mm.

Figure 4:
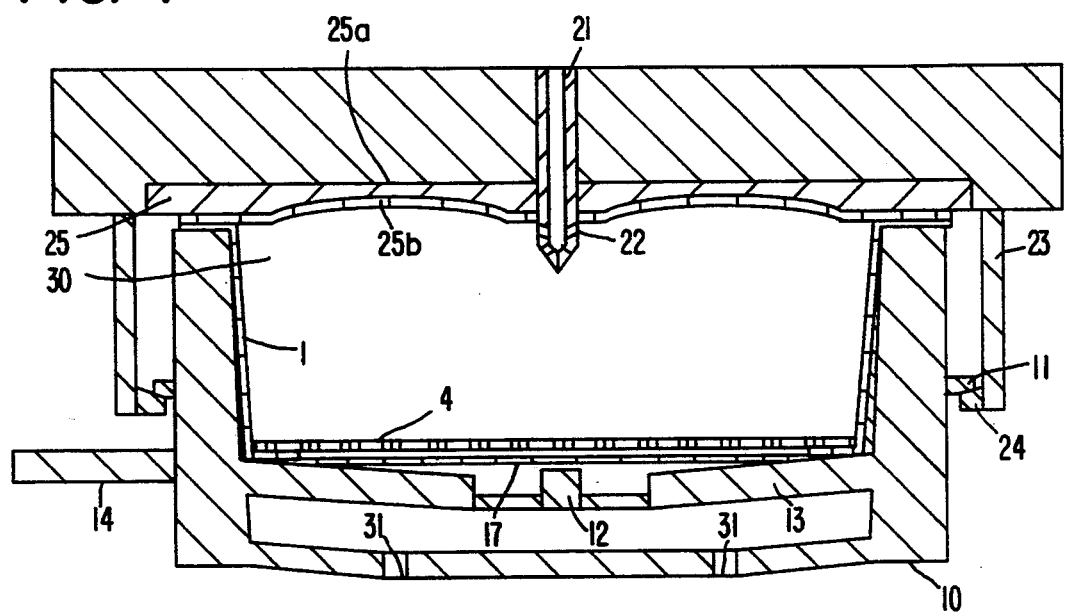
FIG. 4 is a section through the complete cartridge extraction system using the device shown in FIG. 2.

FIGS. 2–4 show another embodiment of the device according to the invention. This device housing (20) which contains a circular seal a comprises a member (25) and a water injector (21) having water outlet holes (22). The seal member (25) has a first surface (25a) positioned adjacent the base of housing (20) and a second surface (25b) which opposes the first surface (25a). In addition, the device comprises a tightening ring (23) with tightening ramps (24), and the circular seal member (25) has a bore centrally disposed therethrough around the periphery of the injector member (21) which extends longitudinally therethrough. The second surface (25b) of seal member (25) is divided into three zones, namely: two flat portion, one at the centre (26) and the other at the periphery (28), and a circular concave portion (27) provided for cartridges having a curved upper surface. The outer zone (28) must be flat to ensure imperviousness during extraction. The flat zone (26) is necessary because, during piercing of the cartridge when the upper membrane deforms downwards, the zone (261 compensates this deformation to avoid the reflux of coffee grounds during release of the cartridge after extraction.

As also is illustrated in FIGS. 2 and 4, the tightening ring extends from the housing member, which contains the seal member (25) and injector member (22), and has a surface which extends from the housing member transversely with respect to the seal member flat surface portions (26) and (28) and which is positioned about the seal member flat surface portion (28). The ramps (24) extend transversely from the surface for supporting the cartridge holder (10) (FIG. 4).

The complete extraction system (FIG. 4) additionally comprises a cartridge holder (10) which has a base, for supporting the cartridge (1), and has a wall which extends transversely from the base and forms an inner surface, for containing a side of the cartridge (1), an outer surface and a wall edge between the surfaces displaced from the base, and the lugs (11) extend transversely from the outer surface for engaging the tightening ring ramps (24) for supporting the holder (10). The cartridge holder thus comprises a recess for the cartridge (1) and, beneath this recess, a fixed central finger (12) and radial fins (13) which support the lower wall (17) and the filter (4) of the cartridge to be extracted. The handle (14) provides for easy handling of the cartridge holder.

The cartridge (1) containing the coffee (30) is introduced into the cartridge holder (10) and engaged in the tightening ring (23), the water injector (21) piercing the upper face of the cartridge (1). As shown in FIG. 4, the seal member part (28) has a size sufficient so that upon engagement of the lugs (11) and the ramps (24), the cartridge holder edge is positioned to align with the seal member part (28), and the peripheral surface portion of the cartridge (1) is positioned between the holder peripheral edge and the seal member part (28). Thus, the inner surface of the ramps (24) and lugs (11) are positioned so that the holder is engageable with the tightening ring so that upon engagement, the holder edge is positioned to secure a peripheral surface portion of a cartridge against the seal member part (28) to effect imperviousness upon extraction.

The water arrives through the orifices (22) of the water injector (21) and wets the entire layer of coffee (30). Under the effect of the water pressure, the lower face (17) of the cartridge deforms and is applied against the central finger (12). The face tears on reaching its yield stress. The filter (41 also deforms, but is of such a thickness that it does not tear. The actual extraction process can then begin. The coffee issues through the orifices (31) of the cartridge holder (10).

The surface (25) of rubber guarantees high imperviousness during the extraction process while the orifices (22) directed towards the top of the cartridge ensure thorough wetting of the layer of coffee.

I claim:

1. In a device for extraction of a material contained in a cartridge for preparation of a beverage having a housing member which has a base, having an injector member which extends longitudinally about a longitudinal axis from the housing member base for piercing a cartridge and which has outlets displaced at a position away from the base and disposed for directing water from the injector member into a cartridge for extraction of a material in a cartridge and having a seal member which has a first seal surface and a second seal surface which opposes the first seal surface and wherein the seal member is positioned at the base of the housing member so that the first and second seal surfaces extend in a direction perpendicular to the longitudinal axis of the injector member and so that the first seal surface is positioned adjacent the base and wherein the seal member has a centrally disposed bore therethrough from the first surface to the second surface to provide an opening for sealably surrounding a periphery of the injector member, wherein the improvements comprise:

the seal member second surface having a first centrally disposed flat surface portion, a second flat surface portion and a third surface portion, wherein the bore is centrally disposed in the first portion and wherein the third portion extends between and connects the first and second portions and is concave with respect to the first and second portions and forms a cavity between the first and second portions;

the injector member having outlets disposed for directing water ejected from the injector member at an angle of from 90° to 65° with reference to the longitudinal axis; and a cartridge holder and a tightening ring wherein the cartridge holder has a base and has a wall having inner and outer surfaces which extends transversely from the base to a wall edge disposed between the inner and outer surfaces and displaced from the base and has lugs which extend transversely from the outer surface, and the tightening ring extends from the housing member and has a surface which extends from the housing member transversely with respect to the first and second surface portions and from a position about the seal member second surface portion and has ramps which extend transversely from the tightening ring surface for engaging the cartridge holder lugs for supporting the cartridge holder, and wherein the seal member second surface portion has a size sufficient so that upon engagement of the ramps and lugs for supporting the cartridge holder, the cartridge holder wall edge is aligned with and adjacent to the seal member second surface portion for effecting compression of a cartridge against the second surface portion.

2. A device according to claim 1 wherein the seal member second surface portion extends to a seal member peripheral edge which is circular in shape.

3. A device according to claim 1 wherein the injector member outlets are positioned at a distance of from 3 mm to 8 mm from the first surface portion.

4. A device according to claim 1 wherein the injector member has between one and ten outlets.

5. A device according to claim 1 wherein the injector member outlets have a size of from 0.2 mm to 1.5 mm in diameter.

6. A device according to claim 1 wherein the seal member is comprised of a rubber material.

7. A device according to claim 1 wherein the seal member is comprised of steel coated with PTFE.

8. In a device for extraction of a material contained in a cartridge for preparation of a beverage having a housing member which has a base, having an injector member which extends longitudinally about a longitudinal axis from the housing member base for piercing a cartridge and which has outlets displaced at a position away from the base and disposed for directing water from the injector member into a cartridge for extraction of a material in a cartridge and having a seal member which has a first seal surface and a second seal surface which opposes the first seal surface and wherein the seal member is positioned at the base of the housing member so that the first and second seal surfaces extend in a direction perpendicular to the longitudinal axis of the injector member and so that the first seal surface is positioned adjacent the base and wherein the seal member has a centrally disposed bore therethrough from the first surface to the second surface to provide an opening for sealably surrounding a periphery of the injector member, where the improvements comprise:

the seal member second surface consisting of a first centrally disposed flat surface portion, a second flat surface portion and a third surface portion, wherein the bore is centrally disposed in the first portion, wherein the second portion extends to a seal member peripheral edge and wherein the third portion extends between and connects the first and second portions and is concave with respect to the first and second portions and forms a cavity between the first and second portions; and the injector member having outlets disposed for directing water ejected from the injector member at an angle of from 90° to 65° with reference to the longitudinal axis of the injector member.

9. A device according to claim 8 wherein the seal member peripheral edge is circular in shape.

10. A device according to claim 8 wherein the injector member outlets are positioned at a distance of from 3 mm to 8 mm from the first surface portion.

11. A device according to claim 8 wherein the injector member has between one and ten outlets.

12. A device according to claim 8 wherein the injector member outlets have a size of from 0.2 mm to 1.5 mm in diameter.

13. A device according to claim 8 wherein the seal member is comprised of a rubber material.

14. A device according to claim 8 wherein the seal member is comprised of steel coated with PTFE.

* * * * *

UNITED STATES PATENT AND TRADEMARK OFFICE
CERTIFICATE OF CORRECTION

PATENT NO. : 5,398,596
DATED : March 21, 1995
INVENTOR(S) : Olivier FOND

It is certified that error appears in the above-indentified patent and that said Letters Patent is hereby corrected as shown below:

Column 1, line 66, after "part", insert --concentric--.

Column 4, line 9, delete "other" and insert therefor --the--.

Column 4, line 15, after "device", insert --comprises a--.

Column 4, line 16, delete "a comprises a".

Column 4, line 27, "portion" should be --portions--.

UNITED STATES PATENT AND TRADEMARK OFFICE
CERTIFICATE OF CORRECTION

PATENT NO. : 5,398,596
DATED : March 21, 1995
INVENTOR(S) : Olivier FOND

It is certified that error appears in the above-indentified patent and that said Letters Patent is hereby corrected as shown below:

Column 4, line 34, "(261" should be --(26)--.

Signed and Sealed this

Twentieth Day of February, 1996

Attest:

BRUCE LEHMAN

*Attesting Officer*     *Commissioner of Patents and Trademarks*